US007027914B2

(12) United States Patent
Katrak et al.

(10) Patent No.: US 7,027,914 B2
(45) Date of Patent: Apr. 11, 2006

(54) DIAGNOSTIC COORDINATION CONTROL

(75) Inventors: Kerfegar K. Katrak, Fenton, MI (US); Paul A. Bauerle, Fenton, MI (US); Joseph M. Stempnik, Warren, MI (US); Kevin T. Sharples, Pinckney, MI (US)

(73) Assignee: General Motors Corporation, Detroit, MI (US)

( * ) Notice: Subject to any disclaimer, the term of this patent is extended or adjusted under 35 U.S.C. 154(b) by 110 days.

(21) Appl. No.: 10/819,724

(22) Filed: Apr. 7, 2004

(65) Prior Publication Data

US 2005/0228576 A1 Oct. 13, 2005

(51) Int. Cl.
*G06F 19/00* (2006.01)

(52) U.S. Cl. ........................ 701/114; 701/115; 307/10.3

(58) Field of Classification Search ................ 123/114, 123/115; 307/10.6
See application file for complete search history.

(56) References Cited

U.S. PATENT DOCUMENTS

| | | | | |
|---|---|---|---|---|
| 4,875,391 | A * | 10/1989 | Leising et al. | 477/155 |
| 4,905,545 | A * | 3/1990 | Leising et al. | 477/133 |
| 4,938,102 | A * | 7/1990 | Leising et al. | 477/154 |
| 5,211,080 | A * | 5/1993 | Leising et al. | 475/123 |
| 6,880,497 | B1 * | 4/2005 | Avery et al. | 123/41.12 |
| 2004/0122565 | A1 * | 6/2004 | Sakurai et al. | 701/1 |
| 2004/0244364 | A1 * | 12/2004 | Makki et al. | 60/285 |
| 2004/0249556 | A1 * | 12/2004 | Makki et al. | 701/114 |
| 2005/0066914 | A1 * | 3/2005 | Avery et al. | 123/41.12 |

* cited by examiner

*Primary Examiner*—John T. Kwon
(74) *Attorney, Agent, or Firm*—Christopher DeVries

(57) ABSTRACT

An engine control system includes an ignition switch that selectively initiates an ignition signal and an operating mode of an engine. A powertrain relay selectively generates a PR load signal based on the ignition signal and the operating mode. A control module enables an ignition signal diagnostic system when the operating mode is a RUN mode, the ignition signal is generated and the PR load signal is generated.

15 Claims, 3 Drawing Sheets

| | Flags | | | | | | |
|---|---|---|---|---|---|---|---|
| | Ignition Signal | PR Status | Control Signal (to PR) | PR Load Signal | Power Mode | Normal /Failure | Ignition Signal Diagnostic |
| A | Inactive | Inactive | Inactive | Inactive | Off or Accessory | Normal | Disable |
| B | Inactive | Inactive | Active | Active | Off or Accessory | Failure | Disable |
| C | Inactive | Inactive | Inactive | Active | Off or Accessory | Failure | Disable |
| D | Active | Active | Inactive | Inactive | Run | Failure | Disable |
| E | Active | Active | Active | Inactive | Run | Failure | Disable |
| F | Inactive | Active | Active | Active | From Run to Off or Accessory | Normal | Disable |
| G | Inactive | Active | Active | Active | Off | Normal | Disable |
| H | Active | Active | Active | Active | Run | Normal | Enable |

*Figure 2*

DIAGNOSTIC COORDINATION CONTROL

FIELD OF THE INVENTION

The present invention relates to engine system diagnostics, and more particularly to coordinating engine system diagnostics.

BACKGROUND OF THE INVENTION

Engine control systems control an engine based on the desired operating mode of the engine. Engine operating modes include, but are not limited to, an OFF mode, an ACCESSORY mode and a RUN mode. In the OFF mode, the engine is not running and the engine control system generates limited control signals. For example, the engine control system may generate a throttle control signal to enable throttle bleed for a short period after transitioning to the OFF mode (i.e., turning the engine off). Additionally, the engine control system may generate a blower control signal to cool the engine for a period during the OFF mode.

Engine control systems may include diagnostic systems to ensure proper operation of some of the components of the engine control system and the integrity of the control signals generated by the engine control system. Traditional engine control systems may generate a false fault status due to improper diagnostic scheduling. For example, an ignition signal diagnostic system monitors a difference between an ignition voltage and a powertrain relay voltage. The ignition signal diagnostic may indicate a false fault status when executed during the period when the engine control system operates the blower to cool the engine in the OFF mode.

SUMMARY OF THE INVENTION

Accordingly, the present invention provides an engine control system including an ignition switch that selectively initiates an ignition signal and an operating mode of an engine. A powertrain relay selectively generates a PR load signal based on the ignition signal and the operating mode. A control module enables an ignition signal diagnostic system when the operating mode is a RUN mode, the ignition signal is generated and the PR load signal is generated.

In one feature, the control module disables the ignition signal diagnostic system when the operating mode is other than the RUN mode.

In another feature, the control module disables the ignition signal diagnostic system when the operating mode is the RUN mode and the PR load signal is not generated.

In another feature, the control module indicates a normal status when the operating mode is one of an OFF and an ACCESSORY mode, the ignition signal is not generated and the PR load signal is not generated.

In another feature, the control module indicates a normal status when the powertrain relay is active, the PR load signal is generated and the control module generates a control signal to the powertrain relay.

In another feature, the engine control system further includes an electronic throttle body (ETB) that regulates a throttle of the engine based on the PR load signal.

In still another feature, the engine control system further includes a run/crank (R/C) relay that generates an ignition signal based on a signal from the ignition switch.

In yet another feature, the engine control system further includes a mode module that determines the operating mode based on a signal from the ignition switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table illustrating the coordinated diagnostic control strategy (DCS) of the present invention.

DETAILED DESCRIPTION OF THE PREFERRED EMBODIMENTS

Figure 1:
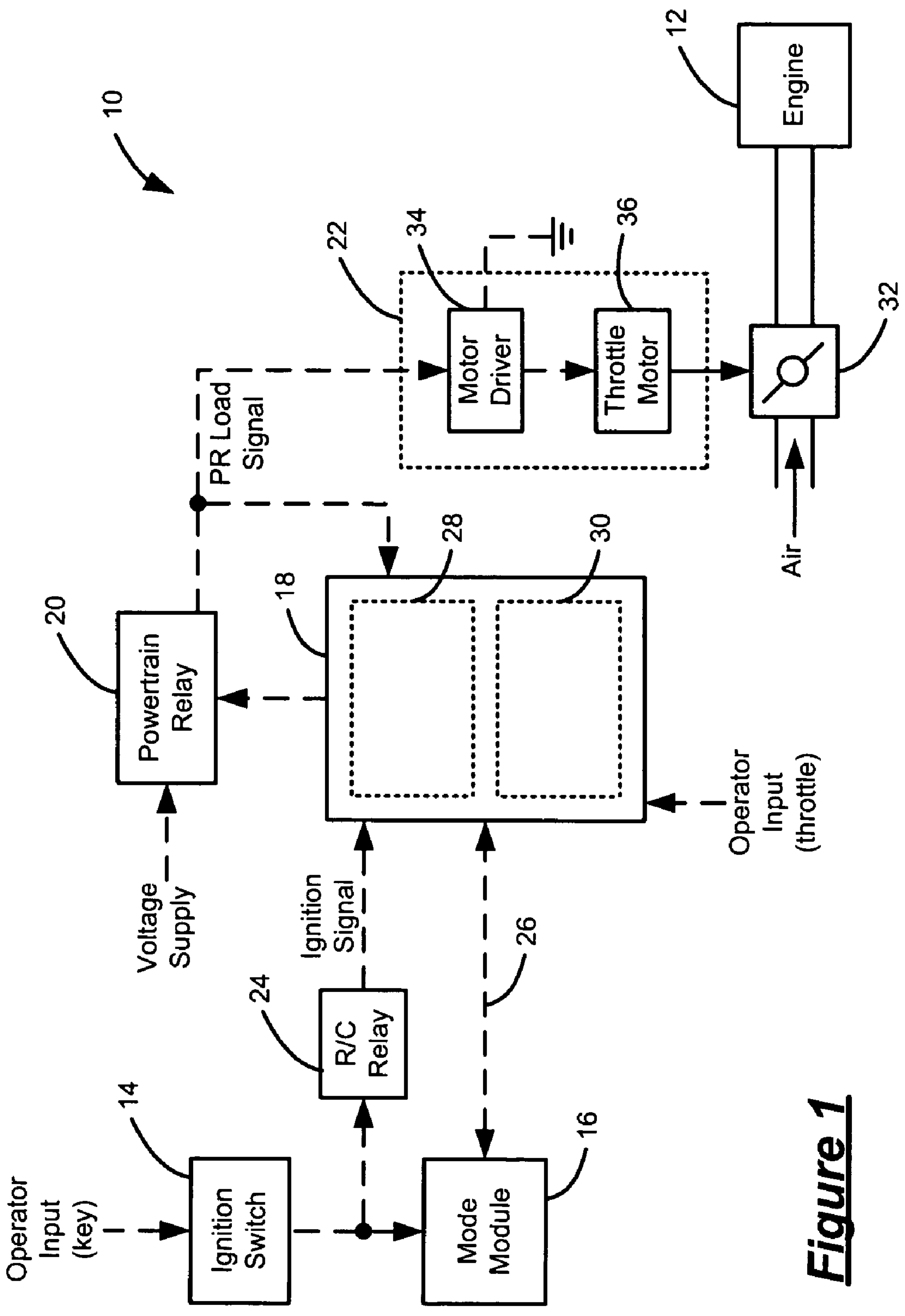
FIG. 1 is a schematic illustration of an engine control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine control system 10 is illustrated. The engine control system 10 is used to control operation of an engine 12. The engine control system 10 includes an ignition switch 14, a mode module 16, a control module 18, a powertrain relay 20 and an electronic throttle body (ETB) 22. The ignition switch 14 generates a mode signal based on an operator input, such as a key position, that is communicated to the mode module 16 and a run/crank (R/C) relay 24. The R/C relay 24 selectively relays an ignition signal to the control module 18 based on the mode signal. The mode module 16 arbitrates the mode signal and determines a particular engine operating mode based thereon. The operating modes include, but are not limited to, an OFF mode, a RUN mode and an ACCESSORY mode. The mode module 16 generates a signal that is communicated to the control module 18 via a controller area network (CAN) bus 26 or other serial communication bus, indicating the desired operating mode.

In the OFF mode, the engine 12 is not operating and there is limited engine control to provide a housekeeping function and fan after run (FAR) function, as explained in further detail below. In the ACCESSORY mode, the engine 12 is not operating, however, there is limited engine control to provide the FAR function and limited vehicle electrical operation including, but not limited to an A/C fan, radio and general electrical system operation. In the RUN mode, the key is in the RUN position and full electrical control is enabled (i.e., all modules are functional).

The control module 18 controls engine operation based on the particular operating mode, an operator input, such as a throttle input and other vehicle operating parameters (e.g., manifold absolute pressure (MAP), RPM, vehicle speed, transmission gear and the like). The control module 18 can include first and second sub-modules 28,30, respectively, that process the various signals described herein. It is anticipated, however, that the coordinated diagnostic control of the present invention can be executed using control modules having additional or fewer sub-modules.

The control module 18 controls the engine 12 and executes diagnostics according to the coordinated diagnostic control system of the present invention. The control module 18 generates a control signal that is communicated to the powertrain relay 20. The powertrain relay 20 generates a powertrain relay (PR) load signal based on the control signal and a voltage supply. The passive load signals regulate passive loads such as solenoids (not shown). The ETB 22 controls a throttle 32 of the engine 12, based on the PR load signal. In the illustrated embodiment, the ETB 22 includes a throttle motor 34 and a motor driver (e.g., an H-bridge driver) 36. Alternatively, it is anticipated that the motor driver can be incorporated into the control module 18. In this case, the PR load signal is sent to the motor driver 36 within the control module 18. The motor driver 36 drives the throttle motor 36 based on the PR load signal. The throttle motor 36 adjusts a throttle position to enable a desired air flow into the engine 12.

With regard to the coordinated diagnostic control system, the control module 18 monitors parameters of the engine control system to determine a normal operating status or a failure operating status and to determine whether to execute an ignition signal diagnostic system. The failure modes include powertrain relay faults including, but not limited to, a control signal fault and a shorted output signal (i.e., PR load signal shorted to power, ground or open).

One normal status includes operation in the OFF or ACCESSORY modes without the engine 12 running and without an ignition signal, a control signal or a PR load signal. Another normal status includes operation in the RUN mode with the engine 12 running and with an ignition signal, a control signal and a PR load signal. Other normal statuses include the housekeeping function and the FAR function. The housekeeping function generally occurs after the operating mode transitions from RUN to either the ACCESSORY or OFF modes (i.e., turning off the engine 12). The housekeeping function lasts for a threshold time (e.g., 2 to 10 seconds) immediately after the engine 12 is turned off so the engine control system can perform any required engine shutdown functions (e.g., throttle bleed). The FAR function lasts for a threshold time (e.g., 5 to 20 minutes) after the engine 12 is turned off. Under the FAR function, the control system can operate a blower to cool the engine 12 in high temperature conditions.

Referring now to FIG. 2, the coordinated diagnostic control system is based on a diagnostic control strategy (DCS), illustrated in tabular form. The DCS enables an ignition signal diagnostic and indicates normal or failure statuses based on the ignition signal, a powertrain relay status, the control signal (i.e., from the control module to the powertrain relay), the PR load signal and the operating mode.

The control module 18 sets flags for the ignition signal, the powertrain relay status, the control signal and the PR load signal. The ignition signal and PR load signal flags are set as inactive or active based on the presence of the particular signal. The signal flags are not based on the value of the particular signal, just whether they are present. For example, if there is no PR load signal generated by the powertrain relay 20, the PR load signal flag is set to inactive. If there is a PR load signal generated by the powertrain relay 20, the PR load signal flag is set to active, regardless of the value. The powertrain status and the control signal flags are also set as inactive or active. For example, if the powertrain relay 20 is generating signals (i.e., the PR load signal), the powertrain status flag is set as active. If the control module 18 is generating the control signal, the control signal flag is set as active.

The DCS includes eight scenarios (A–H). In scenario A, the control module 18 indicates a normal status and disables the ignition signal diagnostic when the ignition signal flag is inactive, the powertrain relay status flag is inactive, the control signal flag is inactive, the PR load signal flag is inactive and the operating mode is either OFF or ACCESSORY. Such a scenario occurs when the engine 12 is not running and there is no powertrain control. In scenario B, the control module 18 indicates a failure status and disables the ignition diagnostic when the ignition signal flag is inactive, the powertrain relay status flag is inactive, the control signal flag is active, the PR load signal flag is active and the operating mode is either OFF or ACCESSORY. Such a scenario occurs when the engine 12 is not running and there is no powertrain control, but a control signal is being generated. This indicates a control signal fault.

In scenario C, the control module 18 indicates a normal status and disables the ignition signal diagnostic when the ignition signal flag is inactive, the powertrain relay status flag is inactive, the control signal flag is inactive, the PR load signal flag is active and the operating mode is either OFF or ACCESSORY. Such a scenario occurs when the engine 12 is not running and there is no powertrain control, however, the PR load signal is being generated by the powertrain relay 20. This indicates a powertrain relay short (e.g., short to power). In scenario D, the control module 18 indicates a failure status and disables the ignition diagnostic when the ignition signal flag is active, the powertrain relay status flag is active, the control signal flag is inactive, the PR load signal flag is inactive and the operating mode is RUN. Such a scenario occurs when there is a control signal fault.

In scenario E, the control module 18 indicates a failure status and disables the ignition signal diagnostic when the ignition signal flag is active, the powertrain relay status flag is active, the control signal flag is active, the PR load signal flag is inactive and the operating mode is RUN. Such a scenario occurs when the engine 12 is not running and there is powertrain control, however, the PR load signal is not generated by the powertrain relay 20. This indicates a powertrain relay short (e.g., short to ground or open).

In scenario F, the control module 18 indicates a normal status and disables the ignition diagnostic when the ignition signal flag is inactive, the powertrain relay status flag is active, the control signal flag is active, the PR load signal flag is active and the operating mode transitions from RUN to either OFF or ACCESSORY. Such a scenario occurs when the engine 12 is turned off and the powertrain relay 20 remains active during the housekeeping function. In scenario G, the control module 18 indicates a normal status and disables the ignition diagnostic when the ignition signal flag is inactive, the powertrain relay status flag is active, the control signal flag is active, the PR load signal flag is active and the operating mode is OFF. Such a scenario occurs when the engine 12 is turned off and the powertrain relay 20 remains active during the FAR function.

In scenario H, the control module 18 indicates a normal status and enables the ignition diagnostic when the ignition signal flag is active, the powertrain relay status flag is active, the control signal flag is active, the PR load signal flag is active and the operating mode is RUN. Such a scenario occurs when the engine 12 is running and normal powertrain control occurs. The ignition signal diagnostic compares the ignition signal and the PR load signal over a threshold period (e.g., 4–6 seconds). More specifically, the ignition signal diagnostic determines the voltage difference between the ignition signal and the PR load signal and generates a fault signal if the difference exceeds a threshold value (e.g., 3V) during the threshold period.

Figure 3:
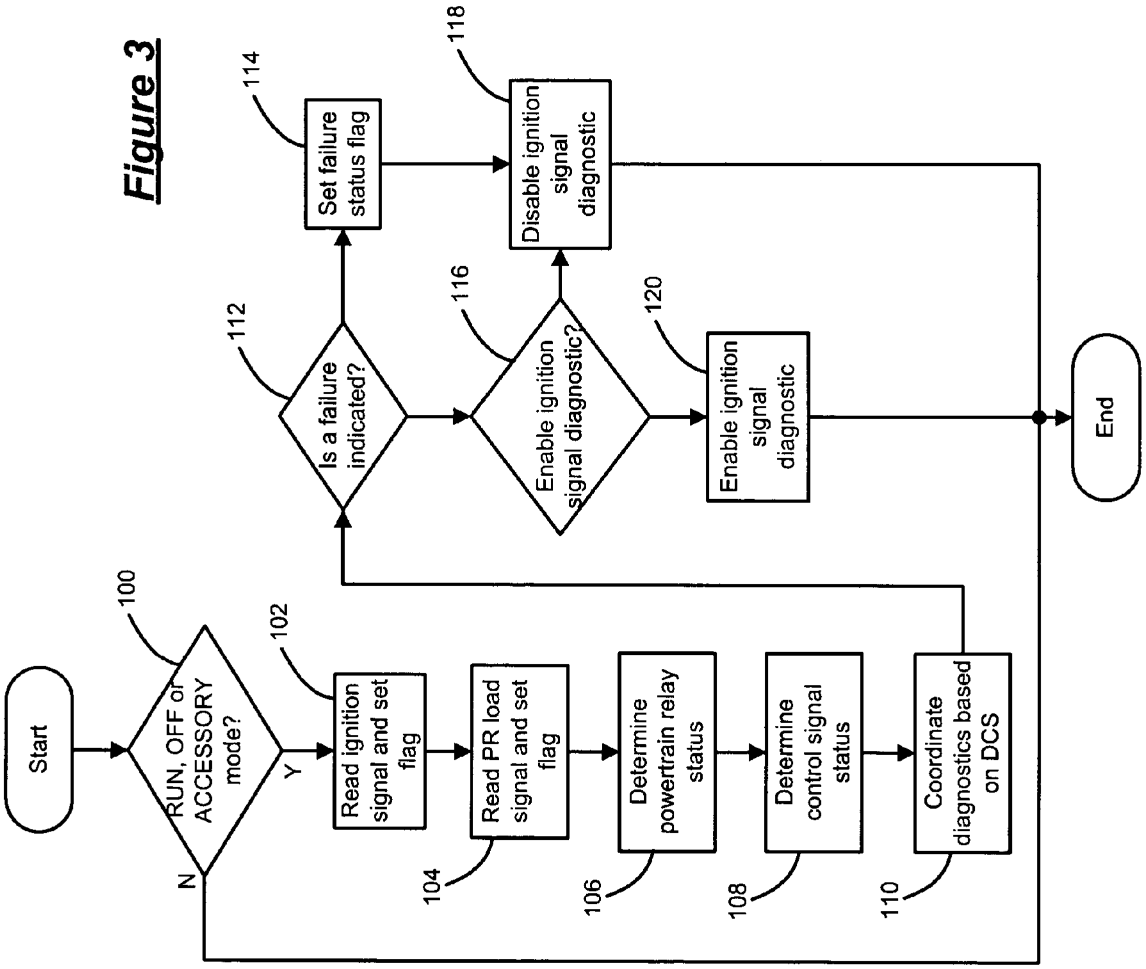
FIG. 3 is a flowchart illustrating the coordinated diagnostic control system of the present invention.

Referring now to FIG. 3, the coordinated diagnostic control system will be discussed in further detail. In step 100, control determines whether the operating mode is one of RUN, OFF and ACCESSORY. If the operating mode is one of these modes, control continues in step 102. If the operating mode is not one of these modes, control ends. In step 102, control reads the ignition signal and sets the ignition signal flag. In step 104, control reads the PR load signal and sets the PR load signal flag. Control determines the powertrain relay status in step 106. In step 108, control determines the control signal status. Control coordinates the diagnostics based on the DCS (see FIG. 2) in step 110.

In step 112, control determines whether a failure is indicated based on the DCS. If a failure is indicated, control sets a failure status flag in step 114 and continues in step 118. If a failure is not indicated, continues in step 116. In step 116, control determines whether the ignition signal diagnostic system is to be enabled based on the DCS. If the ignition signal diagnostic system is not to be enabled, the ignition signal diagnostic is disabled in step 118 and control ends. If the ignition signal diagnostic system is to be enabled, the ignition signal diagnostic system is enabled in step 120 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system, comprising:
- an ignition switch that selectively initiates an ignition signal and an operating mode of an engine;
- a powertrain relay that selectively generates a PR load signal based on said ignition signal and said operating mode; and
- a control module that enables an ignition signal diagnostic system when said operating mode is a RUN mode, said ignition signal is generated and said PR load signal is generated.

2. The engine control system of claim 1 wherein said control module disables said ignition signal diagnostic system when said operating mode is other than said RUN mode.

3. The engine control system of claim 1 wherein said control module disables said ignition signal diagnostic system when said operating mode is said RUN mode and said PR load signal is not generated.

4. The engine control system of claim 1 wherein said control module indicates a normal status when said operating mode is one of an OFF and an ACCESSORY mode, said ignition signal is not generated and said PR load signal is not generated.

5. The engine control system of claim 1 wherein said control module indicates a normal status when said powertrain relay is active, said PR load signal is generated and said control module generates a control signal to said powertrain relay.

6. The engine control system of claim 1 further comprising an electronic throttle body (ETB) that regulates a throttle of said engine based on said PR load signal.

7. The engine control system of claim 1 further comprising a run/crank (R/C) relay that generates an ignition signal based on a signal from said ignition switch.

8. The engine control system of claim 1 further comprising a mode module that determines said operating mode based on a signal from said ignition switch.

9. A method of coordinating diagnostics of an engine control system, comprising:
- determining an operating mode of said engine control system;
- monitoring presence of an ignition signal;
- monitoring presence of a PR load signal; and
- enabling an ignition diagnostic system when said operating mode is a RUN mode, said ignition signal is present and said PR load signal is present.

10. The method of claim 9 wherein said ignition diagnostic system compares said ignition signal and said PR load signal over a threshold time.

11. The method of claim 9 further comprising:
- generating a control signal; and
- operating a powertrain relay to generate said PR load signal based on said control signal.

12. The method of claim 11 wherein said control module indicates a normal status when said powertrain relay is active, said PR load signal is present and said control module generates said control signal.

13. The method of claim 9 further comprising disabling said ignition signal diagnostic system when said operating mode is other than said RUN mode.

14. The method of claim 9 further comprising disabling said ignition signal diagnostic system when said operating mode is said RUN mode and said PR load signal is not present.

15. The method of claim 9 further comprising indicating a normal status when said operating mode is one of an OFF and an ACCESSORY mode, said ignition signal is not present and said PR load signal is not present.

* * * * *